United States Patent [19]

Watanabe et al.

[11] Patent Number: 4,659,628

[45] Date of Patent: Apr. 21, 1987

[54] METHOD OF PRESUBSTRATE TREATMENT FOR PAINTING UTILIZING A GAS SOFT NITRIDING

[75] Inventors: Teruoki Watanabe, Kawagoe; Yahiko Nakamura, Sayama; Akio Hidaka, Kawagoe; Shunji Kobayashi; Hiroyoshi Nozaki, both of Sayama, all of Japan

[73] Assignee: Honda Giken Kogyo Kabushiki Kaisha, Tokyo, Japan

[21] Appl. No.: 753,812

[22] Filed: Jul. 9, 1985

Related U.S. Application Data

[63] Continuation of Ser. No. 51,347, Jun. 25, 1979, abandoned.

[30] Foreign Application Priority Data

Jun. 27, 1978 [JP] Japan ................................ 53-77638

[51] Int. Cl.[4] ........................ B32B 9/00; B32B 15/04

[52] U.S. Cl. ................................... 428/457; 148/6.35; 148/16.5; 148/16.6; 427/255.3; 427/255.4; 427/327; 427/419.7; 428/698

[58] Field of Search ............... 427/248.1, 255.2, 255.3, 427/255.4, 255, 327, 399, 444, 419.7, 255.1; 428/698, 457, 332; 148/6.35, 16.6, 16.5; 29/458, 527.2, DIG. 4; 228/219, 220, 231, 203, 213.15; 252/374

[56] References Cited

U.S. PATENT DOCUMENTS

| | | | |
|---|---|---|---|
| 1,901,039 | 3/1933 | Owens et al. | 148/6.35 |
| 2,343,418 | 3/1944 | Lampton et al. | 148/6.35 |
| 2,444,422 | 7/1948 | Bradford | 148/6.35 |
| 2,472,320 | 6/1949 | Vennerholm et al. | 148/6.35 |
| 2,703,298 | 3/1955 | Branson | 148/6.35 |
| 3,510,366 | 5/1970 | Mears | 148/6.35 |
| 3,686,746 | 8/1972 | Gwyn | 228/220 |
| 3,900,689 | 8/1975 | Deyrup | 427/388.1 |
| 4,003,764 | 1/1977 | Wunning | 148/16.6 |

FOREIGN PATENT DOCUMENTS

| | | | |
|---|---|---|---|
| 2135763 | 1/1975 | Fed. Rep. of Germany | 148/16.6 |
| 45-19764 | 7/1970 | Japan | 148/6.35 |
| 1441092 | 6/1976 | United Kingdom | 148/16.6 |
| 1463053 | 2/1977 | United Kingdom | 427/248 C |

OTHER PUBLICATIONS

Wunning, J., "A New Process and Equipment Installation for Nitriding with an ε-Compound Layer", Metals Society, 1975.

Luiten, C. H., "Nitempering of Steel and Cast Iron", Metallurgia & Metal Forming, pp. 214–218, Aug. 1974.

*Primary Examiner*—Sadie L. Childs

*Attorney, Agent, or Firm*—Irving M. Weiner; Joseph P. Carrier; Pamela S. Burt

[57] ABSTRACT

A paint priming method which forms, on the surface part of a ferrous material to be treated, a nitride layer with an adequate depth and preferably ε phase as a main phase thereof, and with no carbon adhesion to the surface thereof, by carrying out a gas soft nitriding treatment with gas components which generate no free carbon. The nitride layer formed on the surface part of the material is used as a presubstrate on which direct painting is possible, thereby providing a simplified and improved presubstrate treatment for painting.

16 Claims, 2 Drawing Figures

METHOD OF PRESUBSTRATE TREATMENT FOR PAINTING UTILIZING A GAS SOFT NITRIDING

This is a continuation of application Ser. No. 51,347, filed June 25, 1979, now abandoned.

BACKGROUND OF THE INVENTION

1. Field of the Invention

The present invention relates to a paint priming method utilizing a gas soft nitriding to form on the surface of the body to be treated a nitride layer of mainly $\epsilon$ phase, preferably with no carbon adhering, and adapted for direct painting thereon.

2. Description of Relevant Art

In general, washing for the primary purpose of de-waxing machine oils on the surface of a body to be treated, and a presubstrate treatment prior to painting to prevent rusting after painting and to improve the paint film strength, are effected in a known painting process.

The conventional method of presubstrate treatment for painting is very inconvenient because it requires many steps, such as a de-waxing step, a chemical film-formation step, and a finishing step, etc. The equipment required to perform such steps is quite substantial. In addition, many chemical agents, such as a de-waxing reagent, an acid washing reagent, and reagents for chemical film-forming, etc., are required. Thus, the cost becomes high due to the substantial number of devices and chemical agents required. Further, a great deal of equipment is required for waste water treatment due to the use of reagents. All of the foregoing factors result in a very high total cost of the painting.

A gas soft nitriding method has been known as a surface treating technique for a ferrous member so as to build up the fatigue resistance and the wear resistance thereof. This method is able to provide the ferrous member with a soft nitriding treatment which is relatively safe by means of introducing a carrier gas containing nitrogen. Such gas soft nitriding forms a layer of crystal structure known as "$\epsilon$ phase" composed of iron, nitrogen and carbon (Fe-N-C) in the surface part of the ferrous member to be treated.

The present invention effectively solves the problems attendant conventional presubstrate treatment by applying the gas soft nitriding treatment for the presubstrate treatment for painting.

In accordance with the principles of the present invention, when a ferrous member is treated by gas soft nitriding, the surface roughness is increased, the surface is cleaned with the oils on the surface being combusted, the nitride layer formed in the surface part has a high rust resistance, and such treatment is able to be effected by completely dry means. Further, the nitride layer thus formed may be used as a painting presubstrate on which direct painting can be effected, if the nitride layer is of a desired phase and a desired thickness, with no carbon adhesion to the surface being present.

The invention is therefore applicable to a body which requires a gas soft nitriding treatment, but may also be applied to a body which only preferably has such treatment. The gas soft nitriding treatment and the painting treatment can be effected through continuous steps, and can also be applied in combination with a previous process of gas nitriding, such as a brazing step.

SUMMARY OF THE INVENTION

The present invention provides a paint priming method which utilizes a gas soft nitriding which comprises a step of treating a ferrous material with the gas soft nitriding with gas components which do not generate free carbon, so as to form a nitride layer with no carbon adhesion on the surface of the material. The nitride layer is adapted to be directly painted and is formed in a phase of mainly $\epsilon$ phase and having a preferable thickness above $15\mu$.

An object of the invention is to provide a method of presubstrate treatment for painting which utilizes a gas soft nitriding, with simplified painting pretreatment steps, i.e., no wet chemical presubstrate treatment, such as a de-wax washing and a chemical film-forming, is required, and it is possible to effect all steps in a dry system.

Another object of the invention is to provide an extremely useful and highly practical method of presubstrate treatment for painting which utilizes a gas soft nitriding, which eliminates the pollution of the waste water and the deterioration of the working environment. The painting can be effected with safety and at low costs so that the costs of the painted product is greatly reduced. Further, the continuous painting step may be effected just after the gas soft treatment, thereby attaining continuous successive implementation of the gas soft nitriding and painting.

Further objects and advantages of the present invention will become apparent from the following detailed description of the invention.

DETAILED DESCRIPTION OF THE INVENTION

Figure 1:
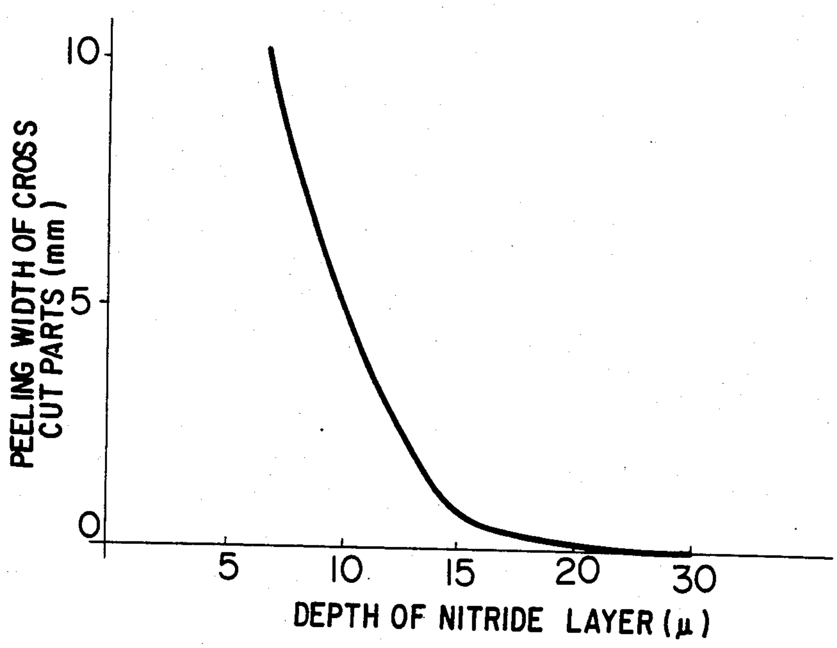
FIG. 1 is a graph showing the relation between the depth of a layer of nitride and a mean peeling width in a cross-cut part of the paint film after a salt water spray test of 72 hours duration.

A presubstrate or paint priming treatment according to the invention is primarily applied to painting surfaces which are exposed outdoors, such as motorcycle frames, whose paint film strength and peeling strength must necessarily be high. A method according to the invention provides the ferrous materials with a gas soft nitriding treatment with gas components which do not cause adhering of free carbon on the surface of the body to be treated. The conventional gas component generally used for gas soft nitriding causes the adhering of carbon on the surface of the body to be treated, i.e., a so-called "starting phenomenon", and a coating is thus impossible to attain unless the surface is cleaned by means of a separate step. Because the gas soft nitriding treatment has heretofore been used in fields where painting is unnecessary, such as on an axle, such problems of cleaning and/or painting have not arisen.

The present inventive method is directed to forming a nitride layer in the surface part of the body to be treated, with the nitride layer preferably being in the form of $\epsilon$ phase as a main phase and having a thickness preferably above 15$\mu$. The thickness above 15$\mu$ of the $\epsilon$ phase results in a very strong resistance to film peeling, and rust resistance is also excellent.

In the gas soft nitride treatment, a $\gamma'$ phase is produced in addition to the $\epsilon$ phase, however, the rust preventiveness of the $\gamma'$ phase is low and the adhering property of a paint film is greatly reduced. Therefore, the nitride layer used for a painting presubstrate should preferably be the $\epsilon$ phase or substantially the $\epsilon$ phase. The present invention is directed to a body to be painted, such as a frame of a motorcycle, which is exposed to rain and wind. A primary object of the invention is to prevent peeling of the paint film even if hit by pebbles, and rust prevention is ensured even in the event of peeling. When the treated parts and materials are to be used under indoor conditions, such as in a room, it may be sufficient to have a rust preventive strength and a peeling property which are lower than that required of a treated body to be used under severe outdoor conditions, so that the layer of the mixed form of $\epsilon$ phase and $\Gamma'$ phase may be sufficient for such indoor conditions. The paint film thickness may be thin when the nitride layer is mainly in $\epsilon$ phase, and even a mixed $\epsilon$ phase and $\gamma'$ phase may be sufficient, depending on the intended use of the treated body, if the paint film is painted thicker. Although the thickness of an $\epsilon$ phase is herein specified as above 15$\mu$, depending on the intended use of the treated body, such thickness may be below 15$\mu$ by adjusting, for example, the paint film thickness.

A gas soft nitriding treatment according to the present invention requires the use of gases which do not generate free carbon, and do not adhere the carbon on the surface of the body to be treated, so that the nitride layer formed is adapted for a presubstrate for painting, and direct painting thereon is possible.

Generally, the gas soft nitriding treatment is effected by a carrier gas whose components, by way of example, are as follows:

(a) Ammonia gas and a heat absorbing gas (RX gas), 50% $NH_3$ gas and 50% RX gas, (50% $NH_3$, 12.5% CO, 15.6% $H_2$, 0.13% $CO_2$, and the remainder nitrogen, amounts, as well as those set forth hereinbelow, being by volume ratio);

(b) Ammonia gas, and a decomposition gas of methanol, 50% $NH_3$ gas, and 50% of the decomposition gas being of methanol, (50% $NH_3$, 16.7% CO, 33.3% $H_2$ and 0.2% $CO_2$);

(c) Ammonia gas and a heat generating type gas (NX gas), 20% $NH_3$ gas and 80% (NX gas), (20% $NH_3$ gas, 1.4% CO, 0.7% $H_2$, 0.04% $CO_2$, and the remainder $N_2$).

The conventional gas components, i.e., (a) and (b) set forth hereinabove, are rich in carbon monoxide content (CO) and the treatment by these gases produces free carbon, and the carbon adheres on the surface of the body to be treated. Thus, the components of (a) and (b) cannot be applied as a presubstrate, for painting. The problem of carbon adhesion is avoided by using the gas components of (c) due to the small content of carbon monoxide (CO) therein, and this composition of gas is preferable for use in the present invention. However, the use of any of the gas components (a), (b), or (c) results in high production costs because they contain a great quantity of ammonia gas, so that the treating cost is quite high.

A preferable combination of gas components for use in the present invention, which does not generate free carbon and is adapted for formation of the $\epsilon$ phase, are as follows:

(1) In a volume ratio:
10% to 30% $NH_3$
2.5% to 4.5% carbon monoxide (CO)
and the remainder $N_2$ gas.

In this example (1), the quantity of ammonia gas ($NH_3$) is considerably reduced compared with the conventional gas components, and more economical production is thus possible. Thus, the cost of the presubstrate is reduced. The specified volume of carbon monoxide (CO) of 2.5–4.5% is related with the formation of the $\epsilon$ phase, and with the formation of the fatigue strength, etc. of the body to be treated. If the value is below 2.5%, the strength and wear resistance of the nitride layer is insufficient; and if it is above 4.5%, free carbon is generated, resulting in carbon adhering on the surface of the body to be treated.

(2) In a volume ratio:
10% to 30% ammonia gas ($NH_3$)
1% to 3% carbon monoxide (CO)
and the remainder a heat generating type gas (NX gas).

The gas of this composition (2) has a reduced content of ammonia, which is economically advantageous. The presence of carbon monoxide (CO) of only 1% to 3%, is due to the containing of same in the NX gas, and if CO is present in combination with NX gas in said range, a treatment equivalent to the above-mentioned treatment is effected.

The present inventive method was employed in conjunction with the brazing of a ferrous material, and the material was successively treated with a gas soft nitriding to obtain an improved mechanical strength, to impart wear resistance to the material due to the gas soft nitriding, and to form a directly paintable presubstrate layer.

The following examples were attained from experimental use of the inventive method:

EXAMPLE I

A ferrous material composed of a cold rolling steel [SPCC in JIS (Japanese Industrial Standard) Composition; below 0.12% C, below 0.50% Mn, below 0.040% P, below 0.045% S, and the remainder Fe] was brazed in a furnace with copper as a brazing medium. Thereafter, the gas soft nitriding treatment was effected at a temperature of 700°–600° C. in the temperature-lowering process of the brazing furnace (650° C. in this experiment), over a period of 40 minutes. In the gas nitriding treatment, the temperature-lowering area in the furnace was separated from other areas, and the gas soft nitriding treatment was carried out by means of introducing a carrier gas for soft nitriding treatment, i.e., a gas which does not generate free carbon as described above. After the treatment, the material was cooled from 600° C. by being permitted to stand in the ambient.

A nitride layer of approximately 21$\mu$ was formed in the surface part of the material, and was substantially of $\epsilon$ phase as determined by means of X-ray diffraction of such layer, and carbon adhesion did not result on the surface of the body treated. A paint was then applied on the surface of the material in such state. In order to observe the adhering strength of the paint film, the peeling resistance was tested by cross-cutting the film with a knife, and applying an adhesive tape after a salt spray test of 72 hours duration. The paint film did not peel at all.

EXAMPLE II

A ferrous material composed of a cold rolling steel (SPCC in Japan Industrial Standard) was brazed in a furnace with copper as a brazing medium. Thereafter, the gas soft nitriding treatment was effected at a temperature of 700°-600° C. (650° C. in this example) in the temperature-lowering process of brazing in the furnace over a period of 30 minutes, and was cooled from 600° C. by being permitted to stand in the ambient. The gas soft nitriding treatment was also carried out with a gas which does not generate free carbon as described hereinabove.

A layer of approximately 14μ nitride was formed in the surface part of the material and was substantially of ε phase as determined by means of X-ray diffraction of the layer. Carbon adhering was not found on the surface of the body to be treated. A paint was then applied on the surface of the material in such state. In order to observe the adhering strength of the paint film, the peeling resistance was tested by cross-cutting the film with a knife and applying an adhesive tape after a salt water spray test of 72 hours duration. A partial peeling of the paint film was observed.

EXAMPLE III

A ferrous series material composed of a cold rolling steel (SPC in Japan Industrial Standard) was brazed in a furnace with copper as a brazing medium. Thereafter, the gas soft nitriding treatment as described hereinabove was effected at a temperature of 700° C.-600° C. (650° C. in this example) in the temperature-lowering process after brazing, over a period of 20 minutes, and was then cooled from 600° C. by being permitted to stand in the ambient.

A layer of approximately 11μ nitride was formed in the surface part of the material, and the ε phase and γ' phase were observed in the layer as determined by means of X-ray diffraction, and no carbon adhesion on the surface was found. A paint was applied on the surface of the material in such state. The peeling resistance of the paint film was tested in the same manner as in examples (I) and (II) above, and peeling of the paint film was found in a mean 6 mm width.

It is clear from the foregoing examples that when γ' phase is formed, rust-resistance is lowered and the adhesive strength is extremely lowered. Thus, it is preferable that the phase formation of the nitride layer for painting presubstrate be occupied by the ε phase, particularly when the material is to be used under severe outdoor conditions. It is further preferable that thickness of the nitride layer of mainly ε phase be above 15μ, and that no carbon adhesion on the surface of the layer be present. When the content of CO is high, e.g., above 10% CO in the gas composition, carbon adhesion results and the adhesive strength of the painted film is greatly decreased. Therefore, a mixed gas which does not generate carbon adhesion as described above is employed in the inventive method.

As can be seen from the above examples, applicant's preferred operating temperature for the gas soft nitriding treatment is in the range of 600° C.-700° C., most preferably 650° C.

The results of the above experiments will now be described with reference to FIGS. 1 and 2. FIG. 1 shows, in the form of a graph, the relation between the depth of the nitride layer and a mean peeling width of the cross-cut parts of the paint film after a salt water spray test of 72 hours duration. The abscissa shows a depth of nitride layer in μ, and the ordinate shows the peeling width of the cross-cut part in mm. The peeling width is extremely large in a layer having a depth below 15μ, and is small in a layer having a depth above 15μ, as shown by the curve in FIG. 1. Thus, it will be understood that it is preferable that the layer depth be above 15μ.

Figure 2:
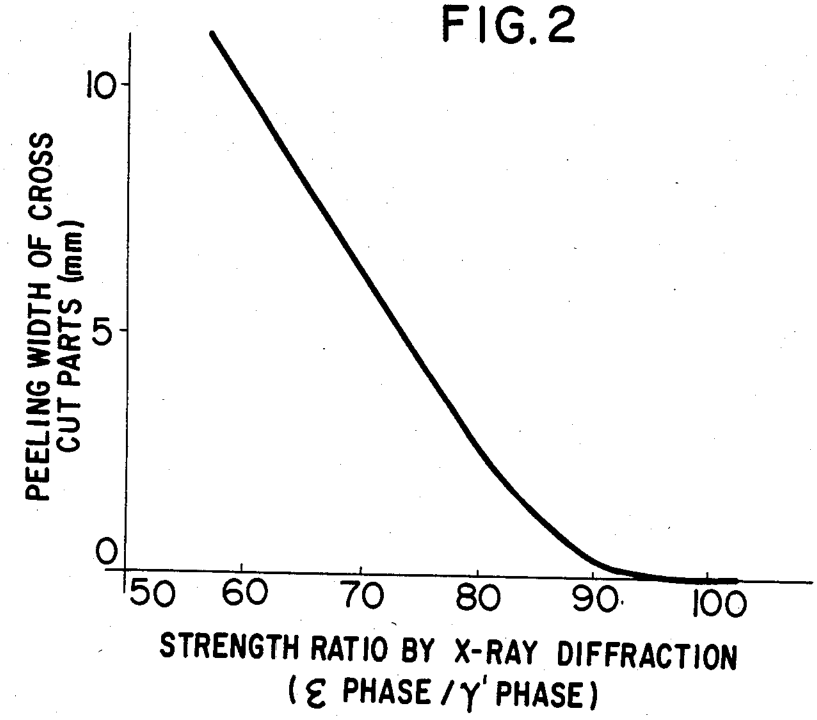
FIG. 2 is a graph showing the relation between the strength ratio, determined by X-ray defraction, of $\epsilon$ phase and $\gamma$ phase of the nitride layer formed by a gas soft nitriding treatment, and a mean peeling width of a cross-cut part of a paint film after a salt water spray test of 72 hours duration.

FIG. 2 shows, in the form of a graph, the relation between a strength ratio determined by X-ray diffraction of the ε phase to the γ' phase of the nitride layer on the surface effected with a gas soft nitriding treatment, and a mean peeling width of the cross-cut part of the paint film after a salt water spray test of 72 hours duration. The abscissa shows the X-ray diffraction strength ratio of ε phase to γ' phase, i.e., the percentage of ε phase, and the ordinate shows the cross-cut width in mm. As shown, the peeling strength of the nitride layer occupied substantially by ε phase is high.

As described above, in accordance with the invention it is possible to effect a presubstrate treatment for painting by a gas soft nitriding treatment using a gas composition which does not generate free carbon, and to eliminate the presubstrate treatment (e.g., de-waxing and washing, cleaning, and chemical film-formation, etc.) which is used in the conventional method, and which is undesirable from the standpoint of pollution and the condition of the working environment. A highly satisfactory presubstrate for painting on the surface of a nitride layer is attained, with no carbon adhesion and with high rust resistance and high peeling strength of the paint film. Further, direct painting may be effected on the surface thereof, thereby simplifying and greatly enhancing the presubstrate treatment.

When combined with brazing, the conventional method has necessitated the steps of phosphate film-formation and painting separately from the brazing step in a furnace. However, in accordance with the present invention a complete product may be obtained by single successive steps in an entirely dry system by means of a gas soft nitriding treatment during a temperature-lowering process, and a direct painting thereafter. Thereby, working steps and energy, as well as labor, are saved, and the products are produced at a greatly reduced cost.

Although there have been described what are at present considered to be the preferred embodiments of the invention, it will be understood that various modifications may be made therein, and it is intended that the present invention may be embodied in other specific forms without departing from the spirit or essential characteristics thereof. The present embodiments are there to be considered in all respects as illustrative, and not restrictive. The scope of the invention is indicated by the appended claims rather than by the foregoing description.

We claim:

1. A paint priming method for a ferrous material, comprising the steps of:

treating said ferrous material so as to provide said material with a directly paintable primed surface by gas soft nitriding an outer surface of said ferrous material with a mixed gas containing 10%-30% ammonia ($NH_3$), 2.5%-4.5% carbon monoxide (CO), and the remainder comprising $N_2$ gas, to form a nitride layer having a thickness greater than 15μ on said outer surface of said ferrous material, said mixed gas generating no free carbon, the main phase of said nitride layer being $\epsilon$ phase, said nitride layer having no carbon adhering thereto; and applying paint directly on the surface of said nitride layer.

2. A method according to claim 1, wherein: said gas soft nitriding treatment is effected at a temperature of 600° C.–700° C., and over a period of less than one hour.

3. A method according to claim 2, wherein: said gas soft nitriding treatment is effected at a temperature of 650° C.

4. A method according to claim 2, wherein: said ferrous material is cooled, between said gas soft nitriding step and said painting step, by simply standing in nitriding step and said painting step, by simply standing in its ambient.

5. A method according to claim 1, wherein: said ferrous material is brazed prior to said gas soft nitriding treatment.

6. A paint priming method for a ferrous material, comprising the steps of:

treating said ferrous material so as to provide said material with a directly paintable primed surface by gas soft nitriding an outer surface of said ferrous material with a mixed gas containing 10%–30% ammonia ($NH_3$), 1%–3% carbon monoxide (CO), and the remainder comprising a heat generating type gas having a substantial quantity of $N_2$, and which contains an amount of carbon monoxide (CO) such that the overall amount of carbon monoxide (CO) in the mixed gas is 2.5%–4.5%, to form a nitride layer having a thickness greater than 15$\mu$ on said outer surface of said ferrous material, said mixed gas generating no free carbon, the main phase of said nitride layer being $\epsilon$ phase, said nitride layer having no carbon adhering thereto; and applying paint directly on the surface of said nitride layer.

7. A method according to claim 6, wherein: said gas soft nitriding treatment is effected at a temperature of 600° C.–700° C., and over a period of less than one hour.

8. A method according to claim 7, wherein: said gas soft nitriding treatment is effected at a temperature of 650° C.

9. A method according to claim 7, wherein: said ferrous material is cooled, between said gas soft nitriding step and said painting step, by standing in its ambient.

10. A method according to claim 6, wherein: said ferrous material is brazed prior to said gas soft nitriding treatment.

11. A method according to claim 1, wherein: said gas soft nitriding treatment is effected at a temperature of 675°–700° C.

12. A method according to claim 1, wherein: said mixed gas contains 10%–15% ammonia ($NH_3$).

13. A method according to claim 6, wherein: said gas soft nitriding treatment is effected at a temperature of 675° C.–700° C.

14. A method according to claim 6, wherein: said mixed gas contains 10%–15% ammonia ($NH_3$).

15. A product formed in accordance with the method of claim 1.

16. A product formed in accordance with the method of claim 6.

* * * * *

UNITED STATES PATENT AND TRADEMARK OFFICE
CERTIFICATE OF CORRECTION

PATENT NO. : 4,659,628

DATED : April 21, 1987

INVENTOR(S) : Teruoki WATANABE et al.

It is certified that error appears in the above-identified patent and that said Letters Patent is hereby corrected as shown below:

Column 3, line 21, change "$\Gamma'$" to --$\gamma'$--;
line 48, delete "being".
Column 4, line 1, change "are" to --is--.
Column 5, line 28, change "SPC" to --SPCC--.
Claim 1, line 10, (column 6, line 67), change the comma to --and--;
line 11, (column 6, line 68), change "generating" to --generates--.
Claim 4, lines 4-5,(column 7, lines 15-16), delete "nitriding step and said painting step, by simply standing in".

Signed and Sealed this

Twentieth Day of October, 1987

*Attest:*

DONALD J. QUIGG

*Attesting Officer* *Commissioner of Patents and Trademarks*